United States Patent
Ka

(10) Patent No.: US 9,575,538 B2
(45) Date of Patent: Feb. 21, 2017

(54) MOBILE DEVICE

(71) Applicant: LG ELECTRONICS INC., Seoul (KR)

(72) Inventor: Hokyung Ka, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/899,458

(22) PCT Filed: Jun. 17, 2013

(86) PCT No.: PCT/KR2013/005320
§ 371 (c)(1),
(2) Date: Dec. 17, 2015

(87) PCT Pub. No.: WO2014/204022
PCT Pub. Date: Dec. 24, 2014

(65) Prior Publication Data
US 2016/0147279 A1 May 26, 2016

(51) Int. Cl.
*H04M 1/00* (2006.01)
*G06F 1/32* (2006.01)
*G06F 1/16* (2006.01)

(52) U.S. Cl.
CPC ............ *G06F 1/3231* (2013.01); *G06F 1/1694* (2013.01); *G06F 1/3206* (2013.01); *G06F 1/3296* (2013.01); *Y02B 60/1289* (2013.01)

(58) Field of Classification Search
CPC ...................................................... G06F 1/1694
USPC .......................... 455/557, 566, 574; 713/320
See application file for complete search history.

(56) References Cited

U.S. PATENT DOCUMENTS

2012/0191993 A1  7/2012  Drader et al.
2013/0084922 A1  4/2013  Liu et al.

FOREIGN PATENT DOCUMENTS

JP    2012-226497 A    11/2012
KR    10-0827150 B1    5/2008
WO    WO 2012/082322 A1    6/2012

OTHER PUBLICATIONS

International Search Report and Written Opinion dated Mar. 27, 2014 issued in Application No. PCT/KR2013/005320 (English translation).

*Primary Examiner* — Hsin-Chun Liao
(74) *Attorney, Agent, or Firm* — KED & Associates, LLP

(57) ABSTRACT

A mobile terminal according to the present invention comprises a motion sensor sensing a motion of the user while maintaining an activation state even when the main processor is in a sleep state; a grip sensor being deactivated in case the main processor is in the sleep state and sensing the user's grip; and a sub-processor, where the sub-processor, in case a predetermined motion of the user is detected while the main processor is in the sleep state, determines the user's grip by activating the grip sensor and wakes up the main processor in the event of sensing the user's grip but keeps the main processor in the sleep state otherwise.

17 Claims, 9 Drawing Sheets

(a) AP is deactivated (sleep state)

(b) The user grips a smart phone while he or she is sitting on a chair (c) AP is activated (Wake-up)

Motion examples of the user which do not activate a grip sensor (a) The user moves with gripping a smart phone (b) The user puts the smart phone into his or her pocket (c) The smart phone is inside a bag (a) The user in walking
(b) Magnified view of a mobile terminal (a) The user in walking (b) Magnified view of a mobile terminal (a)

An application is executed in the background while the user is running (b)

Display an execution result of an application in case the user's gaze is recognized

MOBILE DEVICE

CROSS-REFERENCE TO RELATED PATENT APPLICATIONS

This application is a U.S. National Stage Application under 35 U.S.C. §371 of PCT Application No. PCT/KR2013/005320, filed Jun. 17, 2013, whose entire disclosure is hereby incorporated by reference.

TECHNICAL FIELD

The present invention relates to a mobile terminal and more particularly, a mobile terminal capable of controlling wake-up of a main processor based on a user's motion and grip on the mobile terminal.

BACKGROUND ART

As functions of terminals such as personal computers, laptop computers, cellular phones diversify, the terminals are implemented as multimedia players having multiple functions for capturing pictures or moving images, playing music, moving image files and games and receiving broadcasting programs.

To support and enhance the increasing number of functions in a terminal, improving a structural part and/or a software part of the terminal would be desirable. Menu structure implemented for various types of terminals of today including mobile terminals is also getting more complex as the terminals are designed to provide complicated and diverse functions.

Recently, interests are growing in power management of a mobile terminal which inherently has power limitations. In this respect, research is carried out on minimizing power consumption of constituting components including a main processor based on situational information perceived from various sensors.

DISCLOSURE OF INVENTION

Technical Problem

The present invention has been made in an effort to provide a mobile terminal and a method for operating the terminal capable of controlling wake-up of a main processor in a sleep state based on the user's grip, gaze, and so on in case a particular motion of the user is detected.

Another objective of the present invention is to provide a mobile terminal and a method for operating the terminal capable of carrying out a predetermined application to correspond to a detected particular motion of the user in case the main processor is waked up as the above conditions are met.

Technical problems of the present invention are not limited to what are mentioned above and different technical problems not mentioned above will be clearly understood from the descriptions provided below by those skilled in the art to which the present invention belongs.

Solution to Problem

To solve the technical problems above, a mobile terminal according to an embodiment of the present invention comprises a touchscreen; a main processor; a motion sensor sensing a motion of the a user while maintaining an activation state even when the main processor is in a sleep state; a grip sensor being deactivated in case the main processor is in the sleep state and sensing the user's grip; and a sub-processor. The sub-processor, in case a predetermined motion of the user is detected while the main processor is in the sleep state, determines the user's grip by activating the grip sensor and wakes up the main processor in the event of sensing the user's grip but keeps the main processor in the sleep state otherwise.

Meanwhile, the sub-processor, in case the user moves around with gripping his or her mobile terminal while the main processor is in a the sleep state, maintains the sleep state of the main processor. However, at this time, the mobile terminal further comprises a camera and the sub-processor wakes up the main processor if it is determined from analysis of images captured or obtained by the camera that the user's gaze is directed to the mobile terminal although in fact the user moves around gripping the mobile terminal while the main processor is in a the sleep state.

The mobile terminal can further comprise a memory storing an analysis result of application execution patterns for corresponding to individual motions of the user. At this time, the main processor, once waked up by the sub-processor, executes an application corresponding to the detected motion of the user based on the analysis result of application execution patterns for corresponding to the individual motions of the user. At this time, the main processor, once waked up by the sub-processor, displays on the touchscreen a list of applications corresponding to the detected motion of the user based on the analysis result of application execution patterns for corresponding to the individual motions of the user. Also, the main processor, once waked up by the sub-processor, displays on the touchscreen a user interface for releasing a lock state of the mobile terminal.

The mobile terminal can further comprise a memory storing an analysis result of application execution patterns for corresponding to individual motions of the user; and a wireless communication unit carrying out a wireless communication function with an external electronic devices. At this time, the main processor, once waked up by the sub-processor, carries out an application corresponding to the detected motion of the user based on an analysis result of application execution patterns for corresponding to the individual motions of the user, establishes a wireless communication link with the external electronic device, and uses data communicated with the external electronic device through the established wireless communication link for carrying out the application corresponding to the detected motion of the user.

At this time, the mobile terminal further comprises a camera and the main processor executes the application corresponding to the detected motion of the user as a background process and displays on the touchscreen an execution screen of the application corresponding to the detected motion of the user in case the user's gaze is directed to the mobile terminal as a result of analyzing images captured or obtained by the camera.

Also, while executing the application corresponding to the detected motion of the user, if another predetermined motion of the user is detected, the main processor displays on the touchscreen an execution screen of the application corresponding the detection motion of the user.

To solve the technical problems above, a method for operating a mobile terminal according to an embodiment of the present invention, comprises keeping an activate state of a motion sensor and deactivate stat of a grip sensor while a main processor is kept to a sleep state (a); detecting a predetermined motion of the user through the motion sensor;

activating the grip sensor and determining whether or not the user's grip is detected by activating using the activated grip sensor in case the predetermined motion of the user is detected (b); and keeping the main processor to the sleep state although the main processor is waked up based on the user's grip (c) waking up the main processor or maintaining the sleep stat of the main processor based on whether or not the user's grip is detected.

The step (c) can maintaining the sleep state of the main processor may include keeping the main processor into a sleep state maintaining the sleep state of the main processor in case the user moves around with gripping the mobile terminal while the main processor is in the sleep state.

The method for operating a mobile terminal can further comprise capturing obtaining images by using a camera; and analyzing the captured obtained images, where the step (c) can maintaining the sleep state of the main processor may include waking up the main processor if it is determined from a result of analyzing the captured obtained images that the user's gaze is directed to the mobile terminal although in fact the user moves around with gripping the mobile terminal while the main processor is in the sleep state.

The method for operating a mobile terminal can further comprise storing an analysis result of application execution patterns for corresponding to individual motions of the user; and executing an application corresponding to the detected motion of the user based on an analysis result of application execution patterns for corresponding to the individual motions of the user under the control of the waked-up main processor.

The method for operating a mobile terminal can further comprise displaying on the touchscreen an application list corresponding to the detection motion of the user based on an analysis result of application execution patterns for corresponding to individual motions of the user under the control of the waked-up main processor; receiving a touch input through the application list; and executing an application selected by the touch input.

The method for operating a mobile terminal can further comprise displaying on the touchscreen a user interface for releasing a lock state of the mobile terminal under the control of the waked-up main processor. At this time, the executing an application corresponding to the detected motion of the user can include executing an application corresponding to the detected motion of the user if a predetermined input is received through the user interface.

The method for operating a mobile terminal can further comprise storing an analysis result of application execution patterns for corresponding to individual motions of the user. At this time, the executing an application corresponding to the detected motion of the user can include establishing a wireless communication link with the external electronic device under the control of the waked-up main processor; and using data communicated with the external electronic device through the established wireless communication link for executing an application corresponding to the detected motion of the user.

Meanwhile, the application corresponding to the detected motion of the user is executed in the as a background process and the method for operating a mobile terminal can include detecting at least one of the user's gaze toward the mobile terminal and the another predetermined motion of the user; and displaying on the touchscreen an execution result of the application corresponding to the detected motion of the user based on the analysis result at least one of the detected gaze of the user and the detected another predetermined motion of the user.

The method for operating a mobile terminal according to an embodiment of the present invention can be realized by executing a computer program intended for implementing the method for operating a mobile terminal stored in a computer-readable recording medium.

Advantageous Effects of Invention

A mobile terminal according to the present invention (or a mobile terminal to which a method for operating the terminal is applied) wakes up a main processor in a sleep state when a grip on the user's mobile terminal is detected even if a particular motion of the user is recognized, thereby preventing wake-up of the main processor not desired by the user and reducing consumption of current.

A mobile terminal according to the present invention (or a mobile terminal to which a method for operating the terminal is applied) can control wake-up of a main processor in a sleep state according to detection of the user's gaze in addition to a particular motion and grip of the user.

A mobile terminal according to the present invention (or a mobile terminal to which a method for operating the terminal is applied) can execute a predetermined application based on sensing a particular motion and grip of the user (or additional gaze detection of the user) to correspond to the particular motion.

BRIEF DESCRIPTION OF DRAWINGS

The accompany drawings, which are included to provide a further understanding of this document and are incorporated on and constitute a part of this specification illustrate embodiments of this document and together with the description serve to explain the principles of this document.

MODE FOR THE INVENTION

The objectives, characteristics, and advantages of the present invention will be more clearly understood from the following descriptions related to appended drawings. Hereinafter, preferred embodiments according to the present invention will be described in more detail with reference to appended drawings. The same reference number denotes the same constituting element throughout the entire document. Also, if it is determined that functions known to the public related to the present invention or a specific descriptions about structure of the present invention unnecessarily cause ambiguity in understanding technical principles of the present invention, the corresponding descriptions will be omitted.

Hereinafter, a mobile terminal according to embodiments of the present invention will be described below in more detail with reference to the accompanying drawings. In the following description, the suffixes module and unit are used in reference to components of the mobile terminal for convenience of description and do not have meanings or functions different from each other.

The mobile terminals described herein may include a cellular phone, a smart phone, a laptop computer, a digital broadcasting terminal, a personal digital assistant (PDA), a portable multimedia player (PMP), and a navigation system. However, the present invention is not limited to the types of mobile terminals described above.

Figure 1:
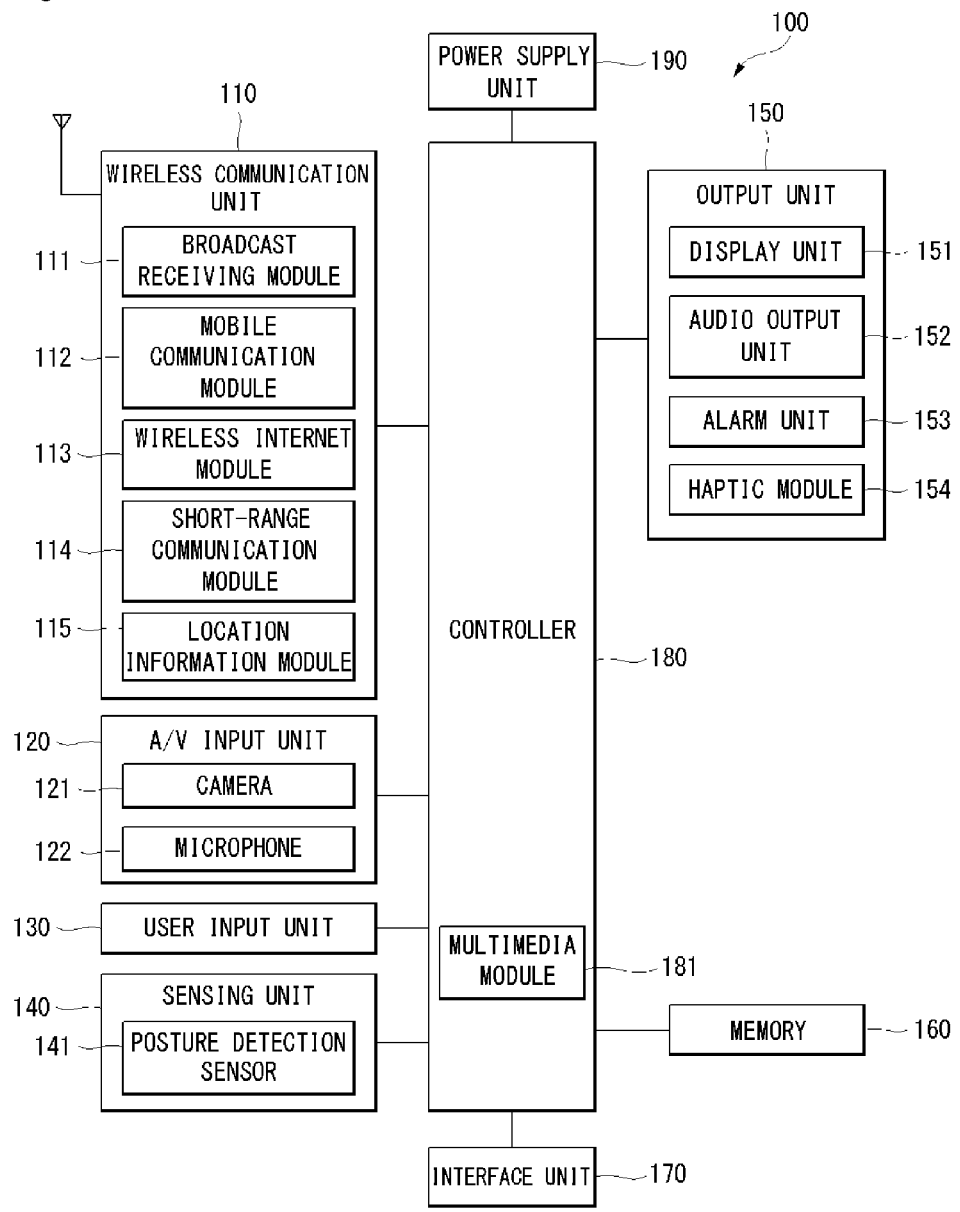
FIG. 1 is a block diagram of a mobile terminal according to an embodiment of the present invention.

FIG. 1 is a block diagram of a mobile terminal 100 in accordance with an embodiment of the present invention. The mobile terminal 100 can include a radio communication unit 110, an audio/video (A/V) input unit 120, a user input unit 130, a sensing unit 140, an output unit 150, memory 160, an interface 170, a controller 180, and a power supply 190. The components shown in FIG. 1 are not essential parts and the number of components included in the mobile terminal can be varied.

The components of the mobile terminal will now be described.

The radio communication unit 110 can include at least one module that enables radio communication between the mobile terminal 100 and a radio communication system or between the mobile terminal 100 and a network in which the mobile terminal 100 is located. For example, the radio communication unit 110 can include a broadcasting receiving module 111, a mobile communication module 112, a wireless Internet module 113, a local area communication module 114 and a position information module 115.

The broadcasting receiving module 111 receives broadcasting signals and/or broadcasting related information from an external broadcasting management server through a broadcasting channel.

The broadcasting channel can include a satellite channel and a terrestrial channel. The broadcasting management server can be a server that generates and transmits broadcasting signals and/or broadcasting related information or a server that receives previously created broadcasting signals and/or broadcasting related information and transmits the broadcasting signals and/or broadcasting related information to a terminal. The broadcasting signals can include not only TV broadcasting signals, radio broadcasting signals and data broadcasting signals but also signals in the form of combination of a TV broadcasting signal and a radio broadcasting signal.

The broadcasting related information can be information on a broadcasting channel, a broadcasting program or a broadcasting service provider. The broadcasting related information can be provided even through a mobile communication network. In this case, the broadcasting related information can be received by the mobile communication module 112.

The broadcasting related information can exist in various forms. For example, the broadcasting related information can exist in the form of electronic program guide (EPG) of digital multimedia broadcasting (DMB) or in the form of electronic service guide (ESG) of digital video broadcast-handheld (DVB-H).

The broadcasting receiving module 111 receives broadcasting signals using various broadcasting systems. Particularly, the broadcasting receiving module 111 can receive digital broadcasting signals using digital broadcasting systems such as digital multimedia broadcasting-terrestrial (DMB-T), digital multimedia broadcasting-satellite (DMB-S), media forward link only (MediaFLO), DVB-H and integrated services digital broadcast-terrestrial (ISDB-T) systems. The broadcasting receiving module 111 can be constructed to be suited to broadcasting systems providing broadcasting signals other than the above-described digital broadcasting systems.

The broadcasting signals and/or broadcasting related information received through the broadcasting receiving module 111 can be stored in the memory 160. The mobile communication module 112 transmits/receives a radio signal to/from at least one of a base station, an external terminal and a server on a mobile communication network. The radio signal can include a voice call signal, a video telephony call signal or data in various forms according to transmission and receiving of text/multimedia messages.

The wireless Internet module 113 means a module for wireless Internet access and can be included in the mobile terminal 100 or externally attached to the mobile terminal 100. Wireless LAN (WLAN) (Wi-Fi), wireless broadband (Wibro), world interoperability for microwave access (Wimax), high speed downlink packet access (HSDPA) and so on can be used as a wireless Internet technique.

The local area communication module 114 means a module for local area communication. Bluetooth, radio frequency identification (RFID), infrared data association (IrDA), ultra wideband (UWB) and ZigBee can be used as a local area communication technique.

The position information module 115 confirms or obtains the position of the mobile terminal. A global positioning system (GPS) module is a representative example of the position information module 115. According to the current technology, the GPS module 115 can calculate information on distances between one point (object) and at least three satellites and information on the time when the distance information is measured and apply trigonometry to the obtained distance information to obtain three-dimensional position information on the point (object) according to latitude, longitude and altitude at a predetermined time.

Furthermore, a method of calculating position and time information using three satellites and correcting the calculated position and time information using another satellite is also used. In addition, the GPS module 115 continuously calculates the current position in real time and calculates velocity information using the position information.

Referring to FIG. 1, the A/V input unit 120 is used to input an audio signal or a video signal and can include a camera 121 and a microphone 122. The camera 121 processes image frames of still images or moving images obtained by an image sensor in a video telephony mode or a photographing mode. The processed image frames can be displayed on a display module 151.

The image frames processed by the camera 121 can be stored in the memory 160 or transmitted to an external device through the radio communication unit 110. The mobile terminal 100 can include at least two cameras according to constitution of the terminal.

The microphone 122 receives an external audio signal in a call mode, a recording mode or a speed recognition mode and processes the received audio signal into electric audio data. The audio data can be converted into a form that can be transmitted to a mobile communication base station through the mobile communication module 112 and output in the call mode. The microphone 122 can employ various noise removal algorithms for removing noise generated when the external audio signal is received.

The user input unit 130 receives input data for controlling the operation of the terminal from a user. The user input unit 130 can include a keypad, a dome switch, a touch pad (constant voltage/capacitance), jog wheel, jog switch and so on.

The sensing unit 140 senses the current state of the mobile terminal 100, such as open/close state of the mobile terminal 100, the position of the mobile terminal 100, whether a user touches the mobile terminal 100, the direction of the mobile terminal 100 and acceleration/deceleration of the mobile terminal 100 and generates a sensing signal for controlling the operation of the mobile terminal 100. For example, the sensing unit 140 can sense whether a slide phone is opened or closed when the mobile terminal 100 is the slide phone. And the sensing unit 140 can sense a change of the position of the mobile terminal 100, a movement of the mobile terminal or a gesture of the user using a gesture detecting sensor 141. Furthermore, the sensing unit 140 can sense whether the power supply 190 supplies power and whether the interface 170 is connected to an external device. The sensing unit 140 can include a proximity sensor.

The output unit 150 generates visual, auditory or tactile output and can include the display module 151, an audio output module 152, an alarm module 153 and a haptic module 154.

The display module 151 displays information processed by the mobile terminal 100. For example, the display module 151 displays UI or graphic user interface (GUI) related to a telephone call when the mobile terminal is in the call mode. The display module 151 displays a captured or/and received image, UI or GUI when the mobile terminal 100 is in the video telephony mode or the photographing mode.

The display module 151 can include at least one of a liquid crystal display, a thin film transistor liquid crystal display, an organic light-emitting diode display, a flexible display and a three-dimensional display.

Some of these displays can be of a transparent type or a light transmission type. This can be referred to as a transparent display. The transparent display includes a transparent liquid crystal display. The rear structure of the display module 151 can also be of the light transmission type. According to this structure, a user can see an object located behind the body of the mobile terminal 100 through an area of the body of the mobile terminal 100, which is occupied by the display module 151.

The mobile terminal 100 can include at least two display modules 151 according to constitution of the terminal. For example, the mobile terminal 100 can include a plurality of displays that are arranged on a single face at a predetermined distance or integrated. Otherwise, the plurality of displays can be arranged on different sides.

In the case where the display module 151 and a sensor sensing touch (referred to as a touch sensor hereinafter) form a layered structure, which is referred to as a touch screen hereinafter, the display module 151 can be used as an input device in addition to an output device. The touch sensor can be in the form of a touch film, a touch sheet and a touch pad, for example.

The touch sensor can be constructed such that it converts a variation in pressure applied to a specific portion of the display module 151 or a variation in capacitance generated at a specific portion of the display module 151 into an electric input signal. The touch sensor can be constructed such that it can sense pressure of touch as well as the position and area of touch.

When touch input is applied to the touch sensor, a signal corresponding to the touch input is transmitted to a touch controller. The touch controller processes the signal and transmits data corresponding to the processed signal to the controller 180. Accordingly, the controller 180 can detect a touched portion of the display 151.

The touch sensor may be implemented using proximity sensor located in an internal region of the mobile terminal, surrounded by the touch screen, or near the touch screen. The proximity sensor senses an object approaching a predetermined sensing face or an object located near the proximity sensor using electromagnetic force or infrared rays without having mechanical contact. The proximity sensor has lifetime longer than that of a contact sensor and has wide application.

The proximity sensor includes a transmission type photoelectric sensor, a direct reflection type photo-electric sensor, a mirror reflection type photo-electric sensor, a high-frequency oscillating proximity sensor, a capacitive proximity sensor, a magnetic proximity sensor, an infrared proximity sensor, etc.

A capacitive touch screen is constructed such that proximity of a pointer is detected through a variation in an electric field according to the proximity of the pointer. In this case, the touch screen (touch sensor) can be classified as a proximity sensor.

For convenience of explanation, an action of approaching the pointer to the touch screen while the pointer it not being in contact with the touch screen such that location of the pointer on the touch screen is recognized is referred to as proximity touch and an action of bring the pointer into contact with the touch screen is referred to as contact touch in the following description. A proximity touch point of the pointer on the touch screen means a point of the touch screen to which the pointer corresponds perpendicularly to the touch screen when the pointer proximity-touches the touch screen.

The proximity sensor senses proximity touch and a proximity touch pattern (for example, a proximity touch distance, a proximity touch direction, a proximity touch velocity, a proximity touch time, a proximity touch position, and a proximity touch moving state). Information corresponding to the sensed proximity touch action and proximity touch pattern can be displayed on the touch screen.

The audio output module 152 can output audio data received from the radio communication unit 110 or stored in the memory 160 in a call signal receiving mode, a telephone call mode or a recording mode, a speech recognition mode and a broadcasting receiving mode. The audio output module 152 outputs audio signals related to functions (for example, a call signal incoming tone, a message incoming tone, etc.) that are performed in the mobile terminal 100. The audio output module 152 can include a receiver, a speaker, a buzzer, etc.

The alarm module 153 outputs a signal for indicating generation of an event of the mobile terminal 100. Examples of events generated in the mobile terminal include receiving of a call signal, receiving of a message, input of a key signal, input of touch, etc. The alarm module 153 can output signals in forms different from video signals or audio signals, for example, a signal for indicating generation of an event through vibration. The video signals or the audio signals can be also output through the display module 151 or the audio output module 152.

The haptic module 154 generates various haptic effects that the user can feel. A representative example of the haptic effects is vibration. The intensity and pattern of vibration generated by the haptic module 154 can be controlled. For example, different vibrations can be combined and output or sequentially output.

The haptic module 154 can generate a variety of haptic effects including an effect of stimulus according to arrangement of pins vertically moving for a contact skin face, an effect of stimulus according to jet force or sucking force of air through a jet hole or a sucking hole, an effect of stimulus rubbing the skin, an effect of stimulus according to contact of an electrode, an effect of stimulus using electrostatic force and an effect according to reproduction of cold and warmth using an element capable of absorbing or radiating heat in addition to vibrations.

The haptic module 154 can not only transmit haptic effects through direct contact but also allow the user to feel haptic effects through kinesthetic sense of his fingers or arms. The mobile terminal 100 can include at least two haptic modules 154 according to a constitution of the mobile terminal.

The memory 160 can store a program for the operation of the controller 180 and temporarily store input/output data (for example, phone book, messages, still images, and moving images). The memory 160 can store data about vibrations and sounds in various patterns, which are output from when a touch input is applied to the touch screen.

The memory 160 can include at least one of a flash memory, a hard disk type memory, a multimedia card micro type memory, a card type memory (for example, SD or XD memory), a random access memory (RAM), a static RAM (SRAM), a read-only memory (ROM), an electrically erasable programmable ROM (EEPROM), a programmable ROM (PROM) magnetic memory, a magnetic disk and an optical disk. The mobile terminal 100 can operate in relation to a web storage performing the storing function of the memory 160 on the Internet.

The interface 170 serves as a path to all external devices connected to the mobile terminal 100. The interface 170 receives data from the external devices or power and transmits the data or power to the internal components of the mobile terminal 100 or transmits data of the mobile terminal 100 to the external devices.

The interface 170 can include a wired/wireless headset port, an external charger port, a wired/wireless data port, a memory card port, a port for connecting a device having a user identification module, an audio I/O port, a video I/O port, an earphone port, etc., for example.

An identification module is a chip that stores information for authenticating the authority to use the mobile terminal 100 and can include a user identify module (UIM), a subscriber identify module (SIM) and a universal subscriber identify module (USIM). A device (referred to as an identification device hereinafter) including the identification module can be manufactured in the form of a smart card. Accordingly, the identification device can be connected to the mobile terminal 100 through a card slot included in the interface 170.

The controller 180 controls the overall operation of the mobile terminal. For example, the controller 180 performs control and processing for voice communication, data communication and video telephony. The controller 180 can include a multimedia module 181 for playing multimedia. The multimedia module 181 can be included in the controller 180 or separated from the controller 180.

The controller 180 can perform a pattern recognition process capable of recognizing handwriting input or picture-drawing input applied to the touch screen as characters or images.

The power supply 190 receives external power and internal power and provides power required for the operations of the components of the mobile terminal under the control of the controller 180.

The power supply 190 can receive power from a wireless charging device in accordance with a magnetic induction method and charge the battery 195 with the received power. The power supply 190 may charge the battery 195 in normal charging mode or in fast charging mode.

The power receiver 200 of the power supply 190 can generate a charging voltage for the battery 195 based on the pick-up power from the wireless charging device. The controller 180 can control the pick-up power from the wireless charging device by controlling the impedance of one or more elements, related to magnetic induction in the power receiver 200, depending on charging mode and control the charging speed of the battery 195 based on the controlled pick-up power. A charging operation on the battery 195 of the power supply 190 is described in detail later with reference to FIGS. 2 to 14.

Various embodiments of the inventive concept can be implemented in a computer or similar device readable recording medium using software, hardware or a combination thereof, for example.

According to hardware implementation, the embodiments of the inventive concept can be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electrical units for executing functions. In some cases, the embodiments can be implemented by the controller 180.

According to software implementation, embodiments such as procedures or functions can be implemented with a separate software module executing at least one function or operation. Software codes can be implemented according to a software application written in an appropriate software language. Furthermore, the software codes can be stored in the memory 160 and executed by the controller 180.

Figure 2:
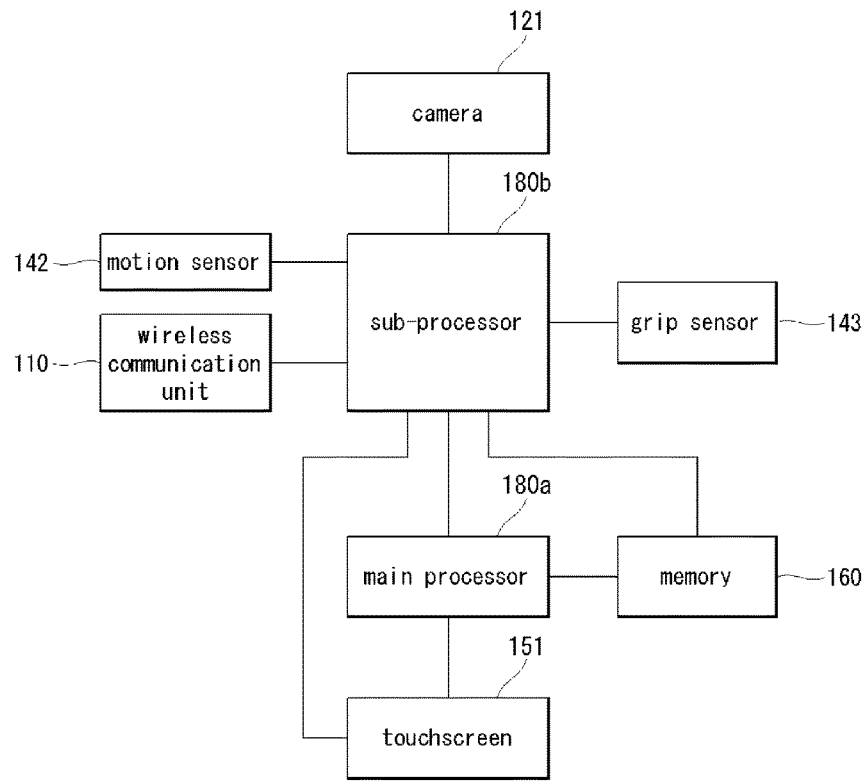
FIG. 2 is a block diagram of another mobile terminal according to another embodiment of the present invention.

FIG. 2 is a block diagram of another mobile terminal according to another embodiment of the present invention. With reference to FIG. 2, the mobile terminal 100 comprises a wireless communication unit 110, a camera 121, a motion sensor 142, a grip sensor 143, a memory 160, a main processor 180a, and a sub-processor 180b. FIG. 2 shows constituting elements required for describing a selective wake-up function for the main processor 180a of the mobile terminal 100. In what follows, operation of each constituting element and functions involved in the selective wake-up of the main processor 180a will be described in detail.

As described earlier, the wireless communication unit 110 carries out a function of wireless communication with external devices and the camera 121 captures the surroundings of the mobile terminal 100. The wireless communication unit 110 establishes a wireless communication link for transmission and reception of data used for a waked-up main processor 180a to carry out a particular application in conjunction with an external electronic device. The images captured by the camera 121 can be used for determining whether the user's gaze is directed to the mobile terminal.

The motion sensor 142 may constitute the sensing unit 140. The motion sensor 142 is capable of sensing the user's motion while staying in an activation state even if the main processor 180a is in a sleep state. The user's motion sensed by the motion sensor 142 can be used later for the sub-processor 180b to determine whether to wake up the main processor 180a in a sleep state.

The memory 160 stores various applications and data required for carrying out a selective wake-up function for the main processor 180a of the mobile terminal 100. For example, the memory 160 can store information about an application supposed to be carried out by a waked-up main processor 180a according to individual motions of the user. Here, information for each user motion may include an analysis result of application execution patterns for individual motions of the user. As a more specific example, in case the user usually listens to music or radio while walking, an application corresponding to the user motion 'walking' may correspond to a 'music play application' and 'radio application'.

The main processor 180a can be waked up while in a sleep state under the control of the sub-processor 180b. The main processor 180a carries out various computations while controlling the overall operation of the mobile terminal 100. In other words, the main processor 180a may correspond to a constituting element included in the controller 180 of FIG. 1. For example, in the case of a smart phone or smart pad, the main processor 180a may correspond to a mobile application processor (AP).

If the main processor 180a is waked up by the control of the sub-processor 180b, the main processor 180a carries out an application corresponding to a detected motion of the user. At this time, the main processor 180a can display on the touchscreen 151 a list of applications corresponding to the detected motion of the user, which can be carried out once selected.

Also, the main processor 180a can provide a user interface for releasing a lock state of the mobile terminal 100 through the touchscreen 151 before carrying out an application corresponding to a detected motion of the user or displaying a list of applications on the touchscreen 151.

Meanwhile, the waked-up main processor 180a can carry out an application corresponding to a detected motion of the user in conjunction with another external electronic device. Data communication with the external electronic device can be carried out through a wireless communication link formed through the wireless communication unit 110.

Execution of an application corresponding to the user's motion, which is carried out in conjunction with the external electronic device, can be carried out in the background. In other words, an execution result of the application may not be displayed immediately on the touchscreen 151 but the execution result can be displayed on the touchscreen 151 when a particular motion of the user is detected or the user applies a particular operation. A more specific example will be described later with reference to FIGS. 12 and 13.

The sub-processor 180b controls activation of the grip sensor 143 based on the user's motion sensed by the motion sensor 142 even when the main processor 180a is in a sleep state. For example, the sub-processor 180 can activate the grip sensor 143 only when a particular motion of the user is detected. Then, the sub-processor 180b can wake up the main processor 180a selectively only when the user's grip is detected by the grip sensor 143.

The sub-processor 180b can be realized in the form of a sensor hub intended for controlling the overall operation of various sensors. Also, the sub-processor 180b can constitute part of the controller 180 illustrated in FIG. 1. At this time, the main processor 180a and the sub-processor 180b can form a single hardware component. In other words, the main processor 180a and the sub-processor 180b can be implemented as a single chip.

Figure 3:
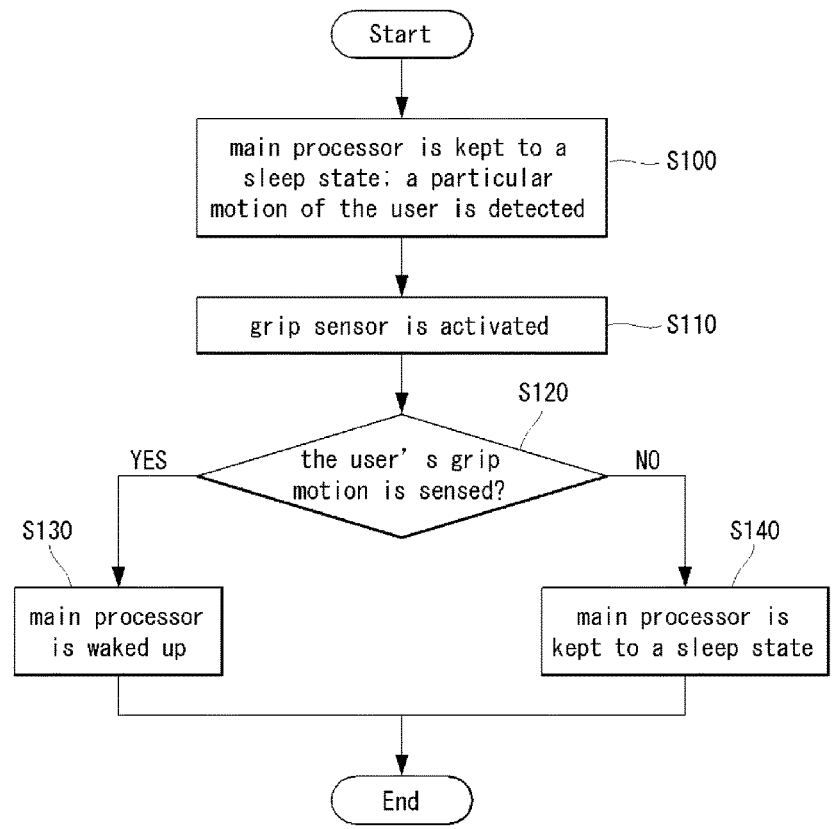
FIG. 3 is a flow diagram illustrating one example of a method for operating a mobile terminal according to the present invention.

FIG. 3 is a flow diagram illustrating one example of a method for operating a mobile terminal according to the present invention. In what follows, the method for operating a mobile terminal will be described with reference to related drawings.

While the main processor 180a is in a sleep state, the motion sensor 142 detects a particular gesture of the user S100. Detection of a particular gesture of the user may be a first condition required for the sub-processor 180b to carry out a wake-up function of the main processor 180a. It should be noted that detection and sensing have the same meaning in this document and are used interchangeably.

If a particular gesture of the user is sensed, the sub-processor 180b activates the grip sensor 143, S110 and determines whether the user's grip on the mobile terminal 100 is sensed S120. Detection of the user's grip may be a second condition for the sub-processor 180b to wake up the main processor 180a.

When the user's grip is detected, the sub-processor 180b wakes up the main processor 180a, S130; however, the sub-processor 180b keeps the main processor 180a to the sleep state without waking it up if the user's grip is not detected S140.

Figure 4:
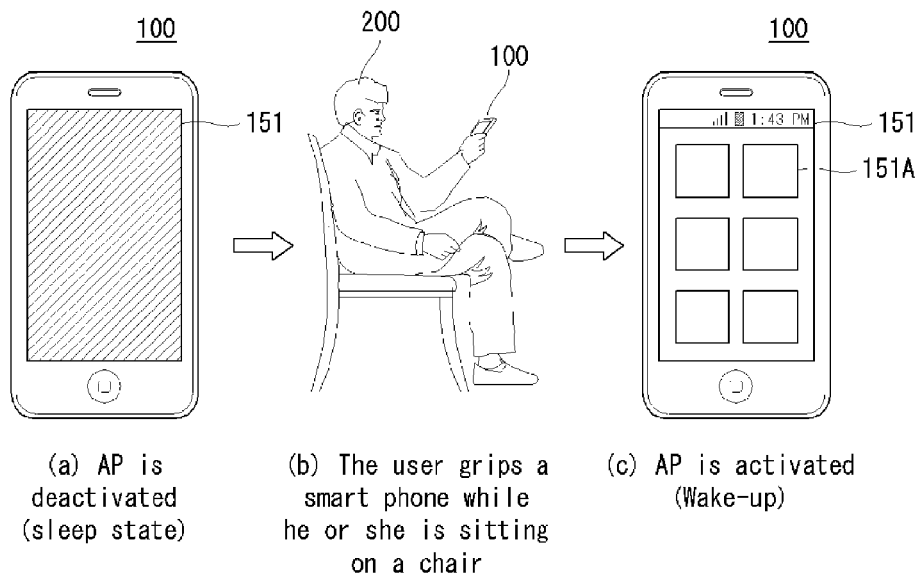
FIG. 4 is an example where a main processor of a mobile terminal is waked up from a sleep state according to a method for operating a mobile terminal of FIG. 3.

FIG. 4 is an example where a main processor 180a of a mobile terminal 100 is waked up from a sleep state according to a method for operating a mobile terminal of FIG. 3.

FIG. 4(a) illustrates a case where the touchscreen 151 is deactivated in case the AP 180a, which is the main processor 180a of the mobile terminal 100, is in a sleep state. As shown in FIG. 4(b), the user's sitting posture and user's grip on the mobile terminal 100 are detected while the mobile terminal 100 is in a state as shown in FIG. 4(a). Then the sub-processor 180b activates the AP 180a and the AP 180a activates the touchscreen 151 as shown in FIG. 4(c).

The user's sitting motion is only an example illustrating a first condition for waking up the AP 180a and the technical scope of the present invention is not limited to this example. The first condition may further include a case where the user walks forward watching his or her mobile terminal 100 if the user stays still at his or her position. Also, the sub-processor 180b can wake up the AP 180a in case the user moves around while simply gripping the mobile terminal 100.

Figure 5:
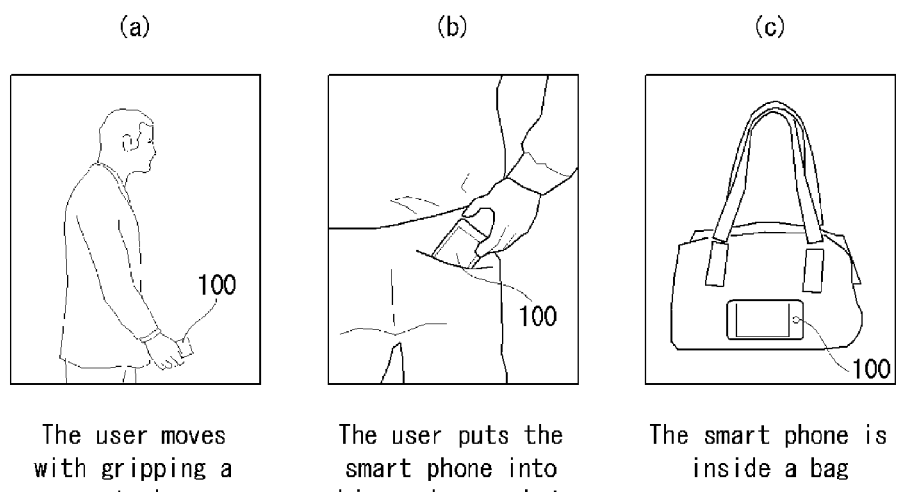
FIG. 5 illustrates examples where a grip sensor of a mobile terminal is kept to a deactivation state according to a method for operating a mobile terminal of FIG. 3.

FIG. 5 illustrates examples where a grip sensor of a mobile terminal 100 is kept to a deactivation state according to a method for operating a mobile terminal of FIG. 3. In these examples, the user's motion itself does not satisfy the first condition for waking up the main processor 180a. In other words, activation of the grip sensor 143 itself is not carried out depending on the method for operating a mobile terminal.

With reference to FIG. 5, motions of the user corresponding to the above include a case where the user moves around without gazing at the mobile terminal 100, a case where the mobile terminal 100 is put in a pocket of the user, a case where the mobile terminal 100 is put inside a bag, and so on. However, the technical scope of the present invention is not limited to the above cases.

According to a method for operating a mobile robot described with reference to FIGS. 3 to 5, the main processor 180a in a sleep state is waked up only when a particular motion of the user and the user's grip on the mobile terminal is detected. Therefore, according to the method for operating a mobile terminal described above, the number of wake-up times of the main processor 180a unintended by the user can be reduced and subsequent reduction of power consumption can be achieved.

Figure 6:
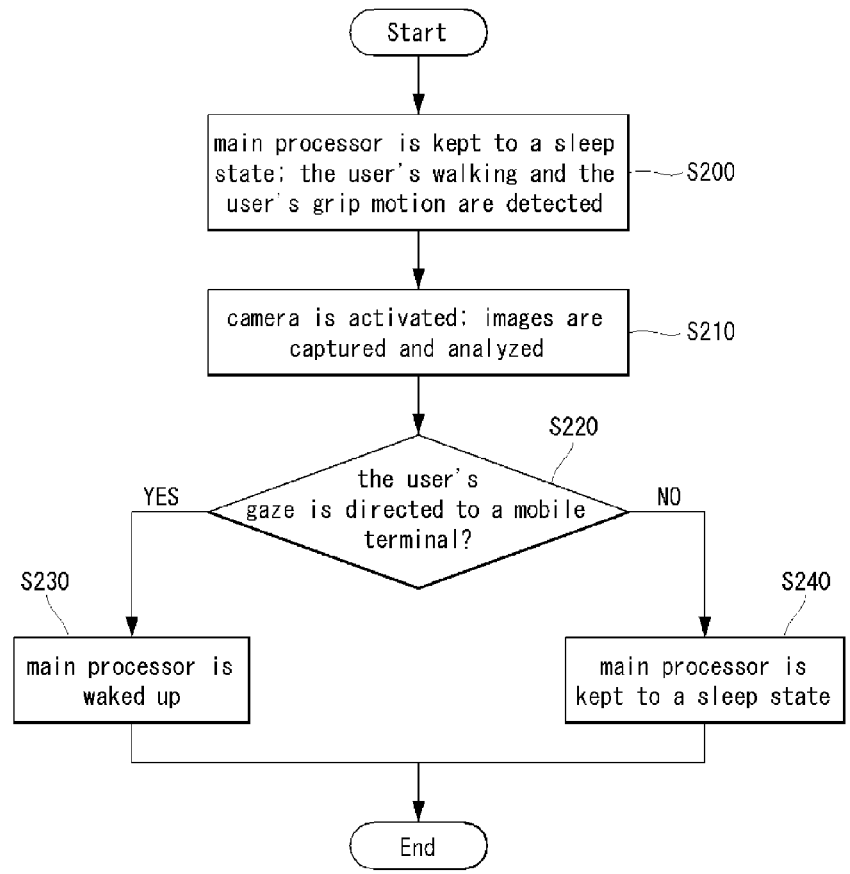
FIG. 6 is a flow diagram illustrating another example of a method for operating a mobile terminal according to the present invention.

FIG. 6 is a flow diagram illustrating another example of a method for operating a mobile terminal according to the present invention. In what follows, the method for operating a mobile terminal will be described with reference to related drawings.

In case the sleep state of the main processor 180a is maintained, the user's walking is detected by the motion sensor 142 and the user's grip on the mobile terminal 100 is detected S200. Then the sub-processor 180b captures (or obtains) images of the surroundings by activating the camera 121 and analyzes the captured images S210.

As a result of analyzing captured images, if it is determined that the user's gaze is directed toward the mobile terminal 100, the sub-processor 180b wakes up the main processor 180a, S230. On the other hand, if the user's gaze is not directed toward the mobile terminal 100, the sub-processor 180b keeps the main processor 180a in the sleep state S240.

Figure 7:
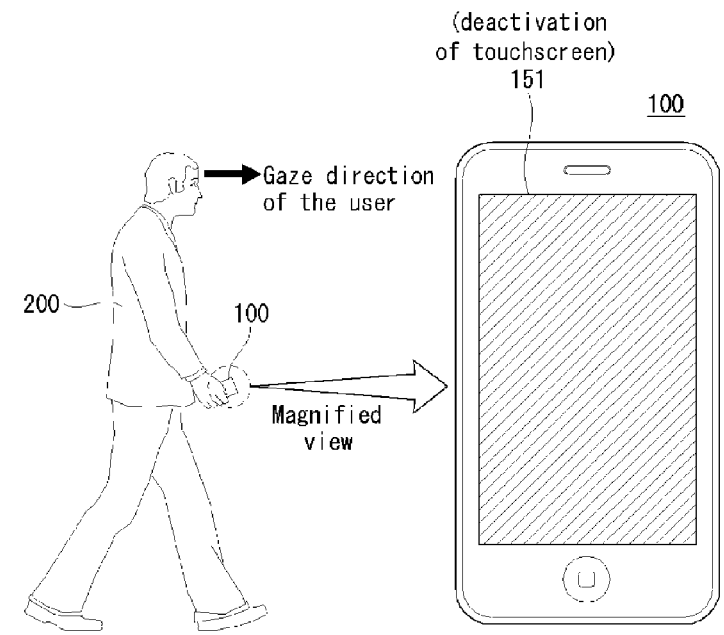
FIG. 7 illustrates an example where a main processor of a mobile terminal is continuously kept to a sleep state according to a method for operating a mobile terminal of FIG. 6.

FIG. 7 illustrates an example where a main processor 180a of a mobile terminal 100 is continuously kept to a sleep state according to a method for operating a mobile terminal of FIG. 6.

With reference to FIG. 7(a), while gripping the mobile terminal 100, the user is walking with his or her eyes away from the mobile terminal 100. Then the sub-processor 180b of the mobile terminal 100 does not activate the main processor 180a and as a result, the touchscreen 151 is also kept in a deactivation state as shown in FIG. 7(b).

Figure 8:
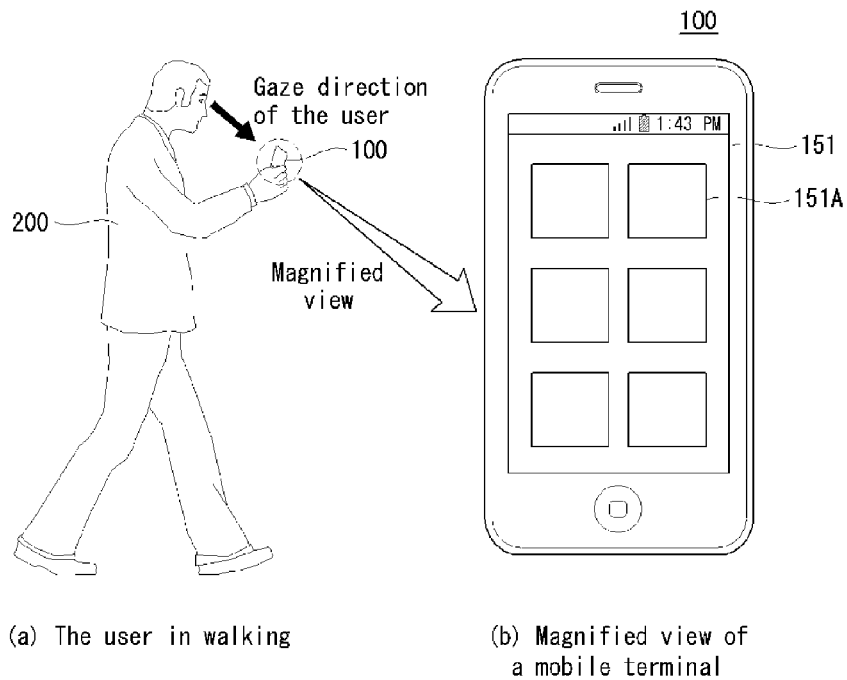
FIG. 8 is an example where a main processor of a mobile terminal is wake up from a sleep state according to a method for operating a mobile terminal of FIG. 6.

FIG. 8 is an example where a main processor 180a of a mobile terminal 100 is wake up from a sleep state according to a method for operating a mobile terminal of FIG. 6.

With reference to FIG. 8(a), while gripping the mobile terminal 100, the user is walking with his or her eyes looking at the mobile terminal 100. Then the sub-processor 180b of the mobile terminal 100 wakes up the main processor 180a and as a result, the touchscreen 151 is also activated as shown in FIG. 8(b). It can be known from FIG. 8(b) that a plurality of icons 151A are displayed on the touchscreen 151 activated.

According to a method for operating a mobile terminal described with reference to FIGS. 6 to 8, the main processor 180a in the sleep state can be waked up only for the case the user's gaze is recognized even if a particular motion of the user and the user's grip on the mobile terminal are detected. Therefore, according to the method for operating a mobile terminal described above, the number of wake-up times of the main processor 180a unintended by the user can be reduced and subsequent reduction of power consumption can be achieved.

Figure 9:
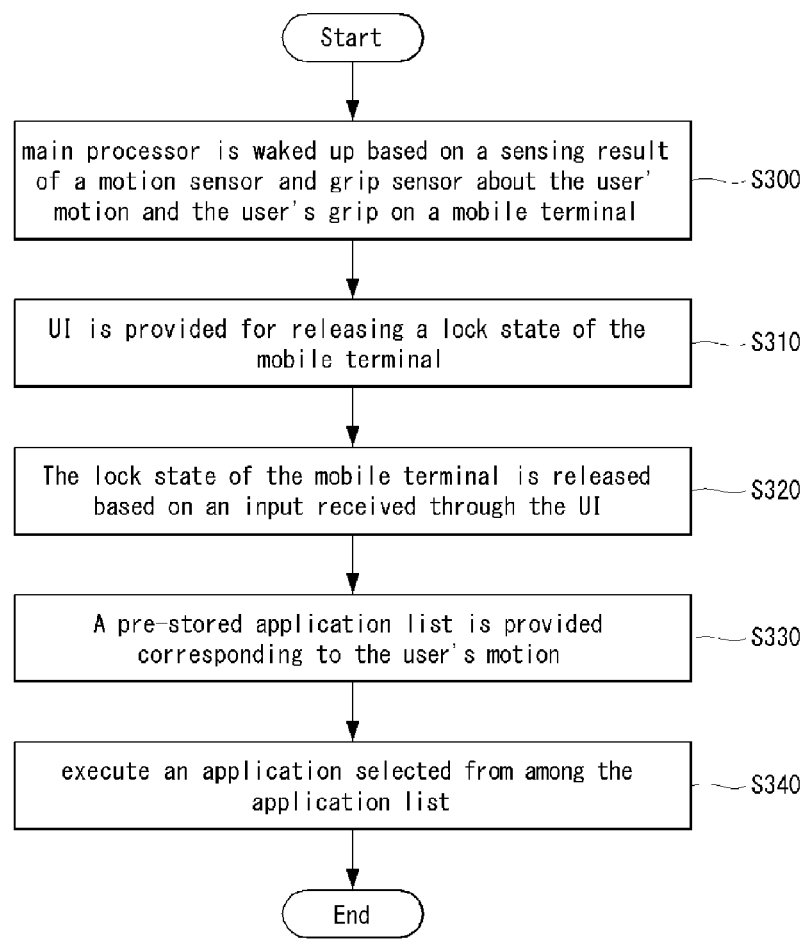
FIG. 9 is a flow diagram illustrating a yet another example of a method for operating a mobile terminal according to the present invention.

FIG. 9 is a flow diagram illustrating a yet another example of a method for operating a mobile terminal according to the present invention. In what follows, the method for operating a mobile terminal will be described with reference to related drawings.

First, based on a sensing result of the motion sensor 142 and grip sensor 143 about the user' motion and the user's grip on the mobile terminal, the main processor 180a in a sleep state is waked up S300. Then the main processor 180a provides through the touchscreen 151 a user interface for releasing a lock state of the mobile terminal 100, S310. The user interface may correspond to a user interface for receiving a password for releasing the lock or a touch input. However, the technical scope of the present invention is not limited to the above.

A predetermined input is received through the user interface. Then the main processor 180a releases the lock state of the mobile terminal 100 based on the predetermined input. Next, the main processor 180a requests related information of applications stored previously in the memory 160 to accommodate the detected motion of the user and based on the information, provides the touchscreen 151 with a list of applications available when selected S330. The related information may be an analysis result of application execution patterns for individual motions of the user.

Next, a touch input for selecting a particular application from the list of applications is received. The main processor 180a then executes the application selected from the list of applications S340.

Different from what are shown in FIG. 9, the mobile terminal 100 can provide through the touchscreen 151 the list of applications immediately after a particular motion of the user and the user's grip on the mobile terminal are detected. Also, if a particular motion of the user and the user's grip on the mobile terminal 100 are detected, the mobile terminal 100 can directly carry out a particular application corresponding to the detected motion of the user. At this time, the particular application can be carried out in the background.

Figure 10:
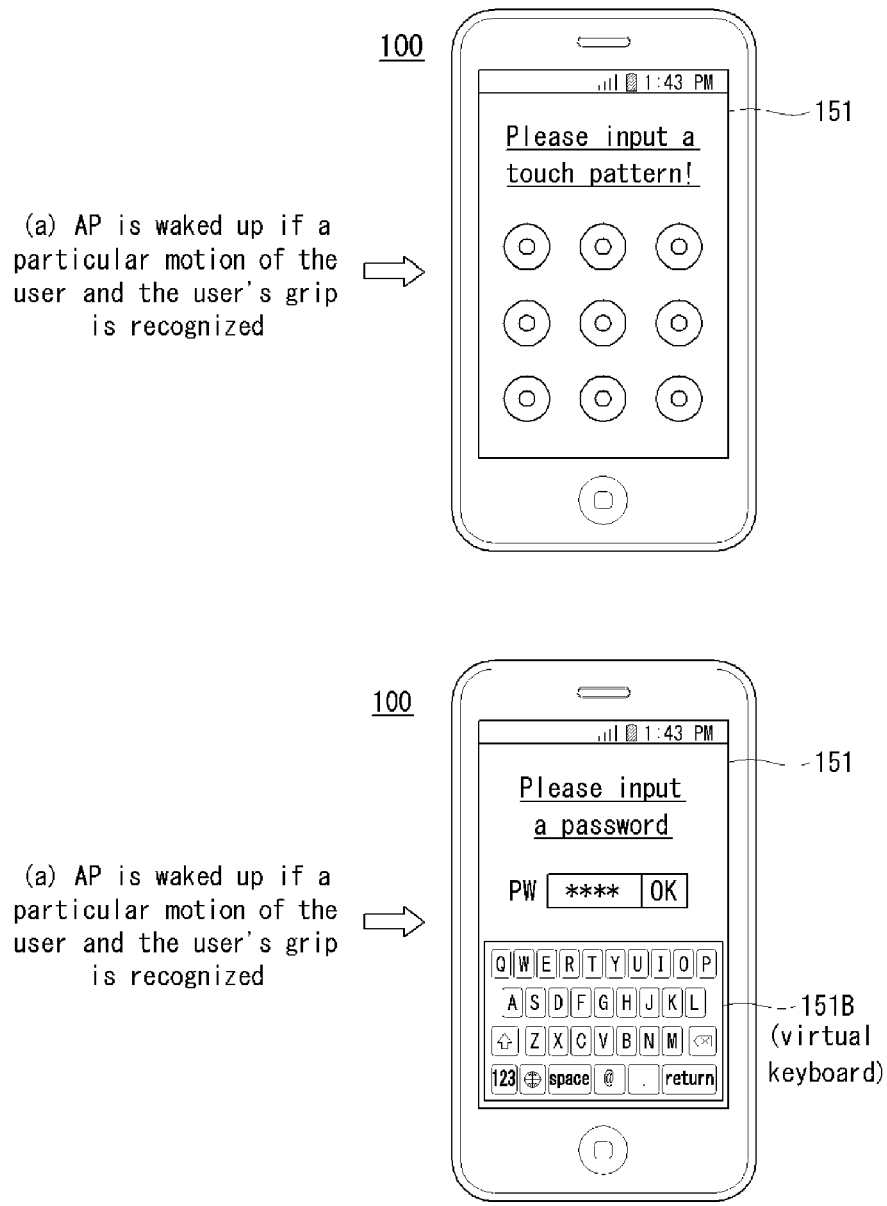
FIG. 10 illustrates examples of a user interface intended for releasing a lock state displayed on a mobile terminal according to a method for operating a mobile terminal of FIG. 9.

FIG. 10 illustrates examples of a user interface intended for releasing a lock state displayed on a mobile terminal 100 according to a method for operating a mobile terminal of FIG. 9.

With reference to FIG. 10(a), it can be known that the user interface is intended for receiving a touch pattern input for releasing a lock state. Also, with reference to FIG. 10(b), the user interface includes a virtual keyboard 151B for receiving a password for releasing the lock state.

Figure 11:
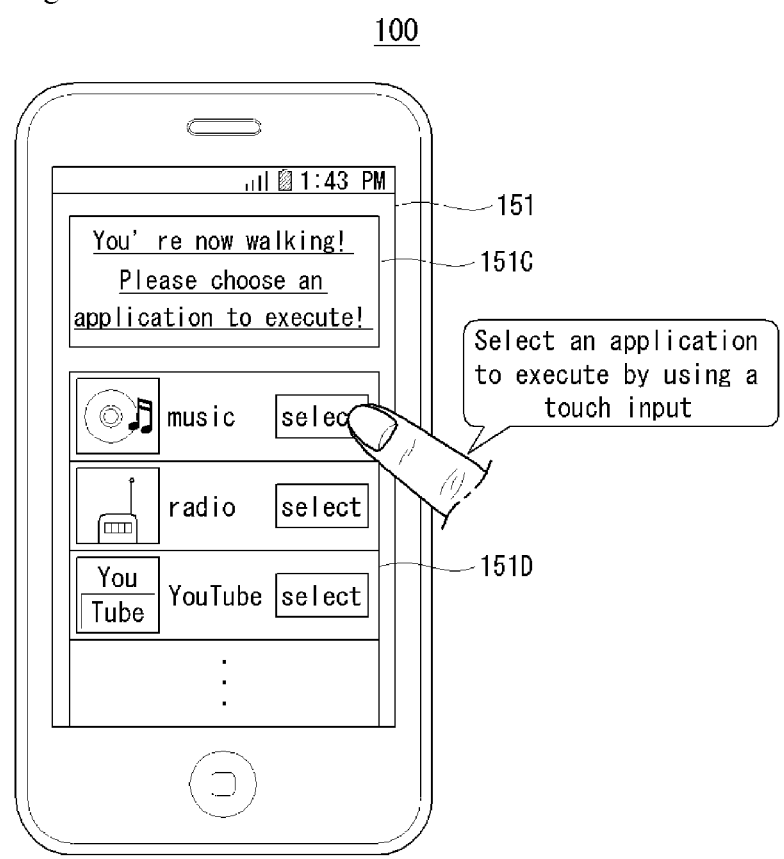
FIG. 11 is one example of a user interface provided for executing an application corresponding to a motion of the user in a mobile terminal according to a method for operating a mobile terminal of FIG. 9.

FIG. 11 is one example of a user interface provided for executing an application corresponding to a motion of the user in a mobile terminal 100 according to a method for operating a mobile terminal of FIG. 9.

With reference to FIG. 11, the user interface includes an area 151C for indicating the state of a detected motion of the user and an area 151D for displaying a list of available applications which can be selected by the user's touch input. More specifically, the area 151C displays that the detected motion of the user is walking while the area 151D displays a music play application, radio application, YouTube application, and the like based on the pattern of applications that the user has executed during his or her walk.

According to the method for operating a mobile terminal with reference to FIGS. 9 to 11, the user can obtain an execution result of applications reflecting an execution history thereof according to the user's motion or an opportunity to execute applications reflecting an execution history thereof according to the user's motion.

Figure 12:
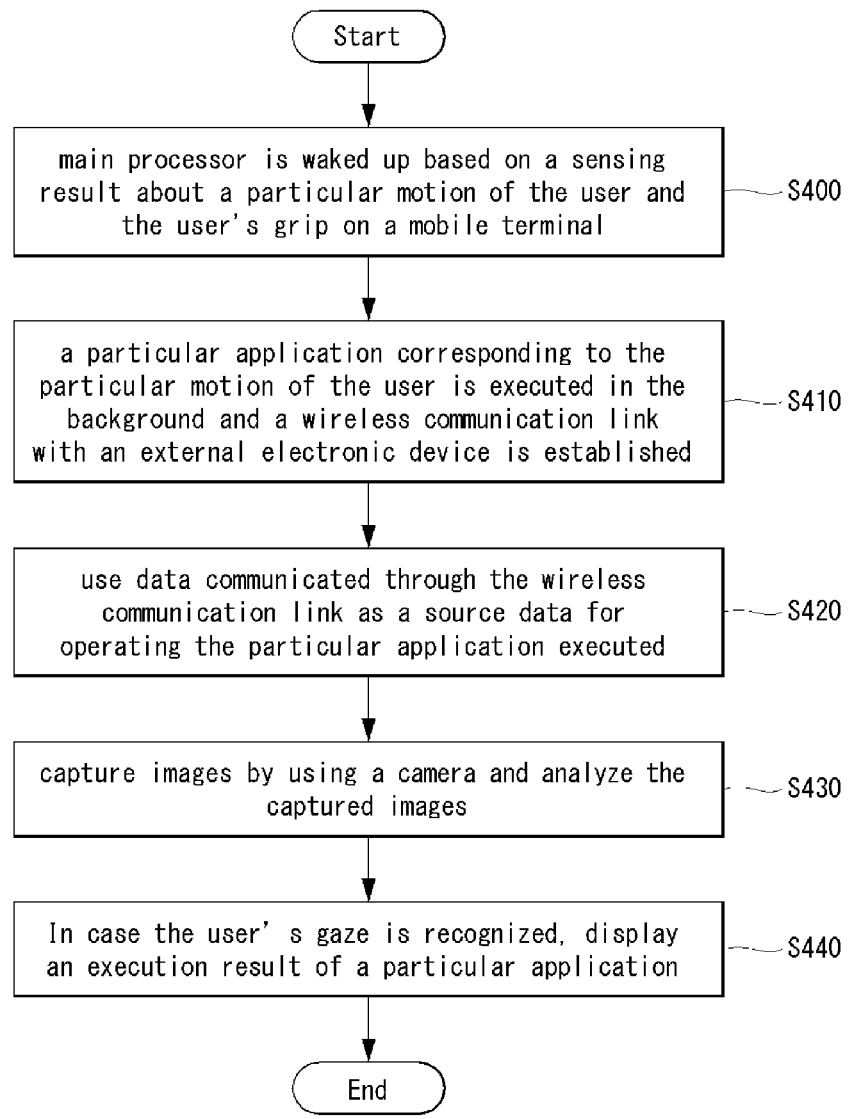
FIG. 12 is a flow diagram illustrating a still another example of a method for operating a mobile terminal according to the present invention.

FIG. 12 is a flow diagram illustrating a still another example of a method for operating a mobile terminal according to the present invention. In what follows, the method for operating a mobile terminal will be described with reference to related drawings.

First, based on a sensing result of the motion sensor 142 and grip sensor 143 about the user' motion and the user's grip on the mobile terminal, the main processor 180a in a sleep state is waked up S400. Then the main processor 180a executes a particular application corresponding to the detected particular motion of the user in the background and establishes a wireless communication link with an external electronic device through the wireless communication unit 110, S410.

Next, the main processor 180a uses the data communicated through the wireless communication link as a source data for operating the particular application executed S420. At this time, the execution result of the particular application may not be displayed on the touchscreen 151.

Next, the main processor 180a captures an image by using the camera 121 and analyzes the captured image S430. And the main processor 180a finally displays the execution result of the particular application on the touchscreen 151 if the user's gaze at the mobile terminal 100 is recognized S440. An incomplete sentence appears here.

Meanwhile the main processor 180a can display on the touchscreen 151 the execution result of the particular application executed in the background if another predetermined motion of the user is recognized.

Figure 13:
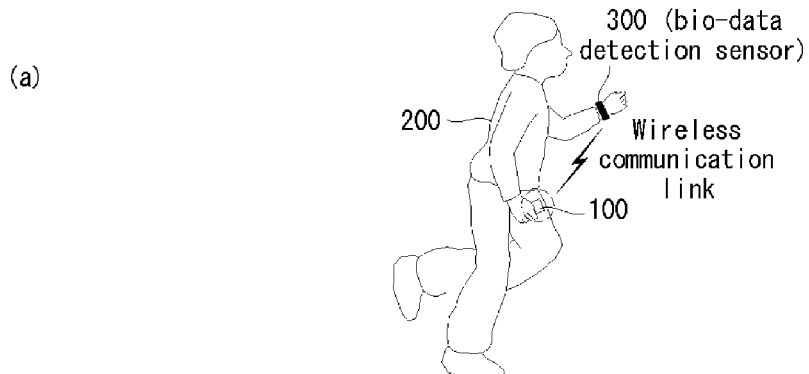
FIG. 13 illustrates an example where an application corresponding to a motion of the user is executed in a mobile terminal based on wireless communication with an external device linked to the mobile terminal according to a method for operating a mobile terminal of FIG. 12.
Figure 13:
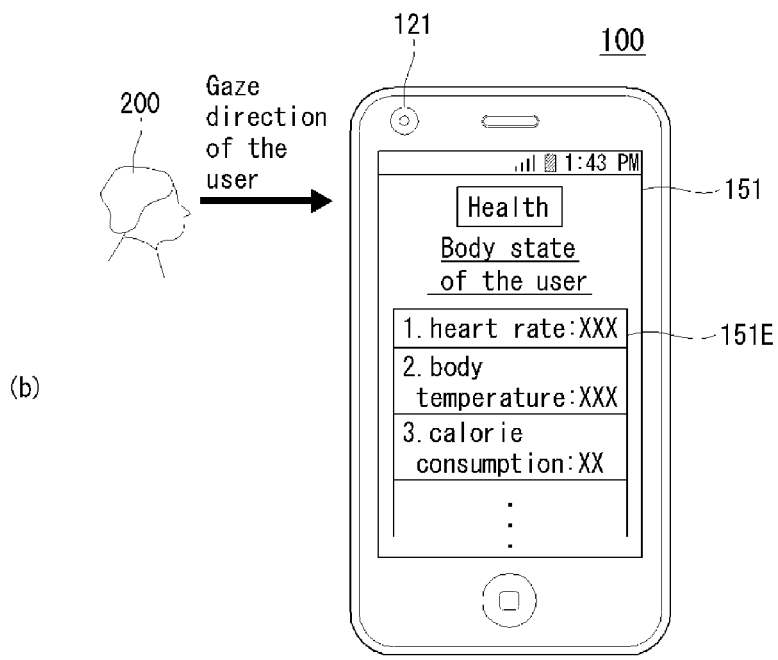

FIG. 13 illustrates an example where an application corresponding to a motion of the user is executed in a mobile terminal 100 based on wireless communication with an external device linked to the mobile terminal 100 according to a method for operating a mobile terminal of FIG. 12.

FIG. 13(a) illustrates a case where the main processor 180a of the mobile terminal 100 executes a particular application in the background intended for analyzing the user's state by using bio-data obtained through wireless communication with an external bio-data detection sensor 300 measuring bio-signals of the user while the user is running with the mobile terminal 100 in the user's hand.

FIG. 13(b) illustrates a case where, in case the user's gaze at the mobile terminal 100 is recognized from the analysis of images captured by the camera 121, the main processor 180a displays on the touchscreen 151 the user's body state obtained as a result of executing the particular application. At this time, the execution result of the particular application is not provided prior to recognition of the user's gaze since displaying the execution result leads to waste of electric power as long as the user does not gaze at the mobile terminal 100.

Meanwhile, the main processor 180a can display the execution result of the particular application in the background on the touchscreen 151 for the case where a particular motion of the user is recognized, too. The particular motion can be regarded as a motion taken before viewing the execution result of the particular application. Particular motions of this kind may include a motion taken when the user stops running, a motion when the user walks, a motion when the user sits, and so on. However, the technical scope of the present invention is not limited to the above descriptions.

Individual methods related to memo functions carried out in a mobile terminal 100 according to the present invention described above can be implemented in the form of a program which can be carried out through various computer means and can be recorded in a computer-readable recording medium. The computer-readable recording medium may record program commands, data files, data structure, and the like separately or in a combination thereof. A program recorded in the medium may correspond to the one specially designed and implemented for the present invention or the one already known to those skilled in the field of computer software.

Examples of a computer-readable recording medium may include magnetic media such as a hard disk, a floppy disk, and a magnetic tape; optical media such as CD-ROM and DVD; magneto-optical media such as floptical disk; and hardware devices such as ROM, RAM, and flash memory specially constructed to store and carry out program commands. Examples of a program may include high-level language codes which can be executed by a computer using an interpreter as well as assembly codes such as those generated by a compiler. The hardware device can be so constructed as to be operated by one or more software modules to carry out operation of the present invention and vice versa.

As described above, although the present invention has been described by a limited number of embodiments and drawings, the present invention is not limited by the embodiments. Rather, those skilled in the art to which the present invention belongs will be able to achieve various modifications from the disclosed embodiments.

Therefore, the scope of the present invention should not be limited by the embodiments described above but should be defined by appended claims and equivalents of the claims.

INDUSTRIAL APPLICABILITY

In accordance with this document, the present invention is used in mobile terminals for preventing wake-up of the main processor undesired by the user and reduging power consumption by the undesired wake-up of the main processor.

The invention claimed is:
1. A mobile terminal, comprising:
a touchscreen;
a main processor;
a motion sensor sensing a motion of a user while maintaining an activation state even when the main processor is in a sleep state;
a grip sensor being deactivated in case the main processor is in the sleep state and sensing the user's grip; and
a sub-processor,
where the sub-processor, in case when a predetermined motion of the user is detected while the main processor is in the sleep state, determines the user's grip by activating the grip sensor and wakes up the main processor in the event of sensing the user's grip but keeps the main processor in the sleep state otherwise.
2. The mobile terminal of claim 1, wherein the sub-processor, in case the user moves around with gripping the mobile terminal while the main processor is in a the sleep state, maintains the sleep state of the main processor.
3. The mobile terminal of claim 2, wherein the mobile terminal further comprises a camera, and the sub-processor wakes up the main processor, if it is determined from when the user's gaze to the mobile terminal is detected based on analysis of images captured obtained by the camera that the user's gaze is directed to the mobile terminal although in fact the user moves around with gripping the mobile terminal while the main processor is in the sleep state.

4. The mobile terminal of claim 1, wherein the mobile terminal further comprises a memory storing an analysis result of application execution patterns for corresponding to individual motions of the user; and the main processor, once waked up by the sub-processor, executes an application corresponding to the detected motion of the user based on the analysis result of application execution patterns for corresponding to the individual motions of the user.

5. The mobile terminal of claim 4, wherein the main processor, once waked up by the sub-processor, displays on the touchscreen a list of applications corresponding to the detected motion of the user based on the analysis result of application execution patterns for corresponding to the individual motions of the user; and executes an application selected by a touch input from among applications included in the application list.

6. The mobile terminal of claim 4, wherein the main processor, once waked up by the sub-processor, displays on the touchscreen a user interface for releasing a lock state of the mobile terminal; and if when a predetermined input is received from the user interface, executes an application corresponding to the detected motion of the user or displays on the touchscreen the application list corresponding to the detected motion of the user.

7. The mobile terminal of claim 1, wherein the mobile terminal further comprises a memory storing an analysis result of application execution patterns for corresponding to individual motions of the user; and a wireless communication unit carrying out a wireless communication function with an external electronic devices, wherein the main processor, once waked up by the sub-processor, carries out an application corresponding to the detected motion of the user based on an analysis result of application execution patterns for corresponding to the individual motions of the user, establishes a wireless communication link with the external electronic device, and uses data communicated from the external electronic device or transmitted to the external electronic device through the established wireless communication link for carrying out the application corresponding to the detected motion of the user.

8. The mobile terminal of claim 7, wherein the mobile terminal further comprises a camera, and the main processor executes the application corresponding to the detected motion of the user as a background process and displays on the touchscreen an execution screen of the application corresponding to the detected motion of the user in case the user's gaze is directed to the mobile terminal as a result of analyzing images captured obtained by the camera.

9. The mobile terminal of claim 7, wherein the main processor executes an application corresponding to the detected motion of the user, and if when another predetermined motion of the user is detected, display an execution screen of the application corresponding to the detected motion of the user is displayed on the touchscreen.

10. A method for operating a mobile terminal, comprising:

keeping an activate state of a motion sensor and an deactivate state of a grip sensor while a main processor is kept to a sleep state (a);

detecting a predetermined motion of the a user through the motion sensor;

activating the grip sensor and determining whether or not the user's grip is detected by using activating the activated grip sensor in case when the predetermined motion of the user is detected (b); and keeping the main processor to the sleep state although the main processor is waked up based on the user's grip (c) waking up the main processor or maintaining the sleep state of the main processor based on whether or not the user's grip is detected.

11. The method of claim 10, wherein the step (c) includes the maintaining the sleep state of the main processor includes keeping maintaining the sleep state of the main processor into a sleep state in case the user moves around with gripping the mobile terminal while the main processor is in the sleep state.

12. The method of claim 11, further comprising: capturing obtaining images by using a camera; and analyzing the captured obtained images, wherein the step (c) maintaining the sleep state of the main processor includes waking up the main processor if it is determined from a result of analyzing the captured images that when the user's gaze to the mobile terminal is directed to the mobile terminal although in fact the user moves around with gripping the mobile terminal while the main processor is in a the sleep state.

13. The method of claim 10, further comprising: storing an analysis result of application execution patterns for corresponding to individual motions of the user; and executing an application corresponding to the detected motion of the user based on an the analysis result of application execution patterns for corresponding to the individual motions of the user under the control of the waked-up main processor.

14. The method of claim 13, further comprising: displaying on the touchscreen an application list corresponding to the detection motion of the user based on an the analysis result of application execution patterns for corresponding to the individual motions of the user under the control of the waked-up main processor;

receiving a touch input through the application list; and executing an application selected by the touch input from among applications included in the application list.

15. The method of claim 13, further comprising: displaying on the touchscreen a user interface for releasing a lock state of the mobile terminal under the control of the waked-up main processor, wherein the executing an the application corresponding to the detected motion of the user includes executing an the application corresponding to the detected motion of the user if when a predetermined input is received through the user interface.

16. The method of claim 13, further comprising: storing an analysis result of application execution patterns for corresponding to individual motions of the user, wherein the executing an application corresponding to the detected motion of the user includes:

establishing a wireless communication link with the an external electronic device under the control of the waked-up main processor; and using data communicated with received from the external electronic device or transmitted to the external electronic device through the established wireless communication link for executing an application corresponding to the detected motion of the user.

17. The method of claim 16, wherein the application corresponding to the detected motion of the user is executed in as the a background process, and
where the method for operating a mobile terminal comprises:
detecting at least one of the user's gaze toward the mobile terminal and the another predetermined motion of the user; and
displaying on the touchscreen an execution result of the application corresponding to the detected motion of the user based on the analysis result based on at least one of the detected gaze of the user and detected another predetermined motion of the user.

* * * * *